United States Patent
Cho

(10) Patent No.: US 8,327,734 B2
(45) Date of Patent: Dec. 11, 2012

(54) STEERING COLUMN OF VEHICLE

(75) Inventor: Sung Hun Cho, Anyang (KR)

(73) Assignee: Hyundai Motor Company, Seoul (KR)

( * ) Notice: Subject to any disclaimer, the term of this patent is extended or adjusted under 35 U.S.C. 154(b) by 357 days.

(21) Appl. No.: 12/690,880

(22) Filed: Jan. 20, 2010

(65) Prior Publication Data

US 2010/0170363 A1   Jul. 8, 2010

Related U.S. Application Data

(63) Continuation-in-part of application No. 11/642,450, filed on Dec. 20, 2006, now abandoned.

(30) Foreign Application Priority Data

Nov. 21, 2006 (KR) .................. 10-2006-0115220

(51) Int. Cl.
*B62D 1/18* (2006.01)
*B62D 1/00* (2006.01)
(52) U.S. Cl. .......................... 74/493; 280/777
(58) Field of Classification Search .............. 74/493; 280/775, 777
See application file for complete search history.

(56) References Cited

U.S. PATENT DOCUMENTS

| | | | |
|---|---|---|---|
| 5,143,402 A | 9/1992 | Higashino et al. | |
| 5,452,624 A | 9/1995 | Thomas et al. | |
| 5,566,585 A | 10/1996 | Snell et al. | |
| 6,282,977 B1 * | 9/2001 | Satoh et al. | 74/493 |
| 2004/0007863 A1 | 1/2004 | Yamasaki | |
| 2004/0159174 A1 | 8/2004 | Raav et al. | |
| 2004/0237695 A1 | 12/2004 | Sato | |

* cited by examiner

*Primary Examiner* — Justin Krause
(74) *Attorney, Agent, or Firm* — Morgan, Lewis & Bockius LLP

(57) ABSTRACT

A steering column of a vehicle can protect a driver's knee by disposing an operation lever inside a column cover in a locked state of the operation lever.

The steering column may include a main housing provided with a column tube therein, an upper housing rotatably connected to the column tube, and with gear teeth at a lower portion of the upper housing, a bracket having a first end rotatably connected to the main housing, and gear teeth at a second end of the bracket and engaged with the gear teeth of the upper housing, and an operation lever having one end rotatably connected to the column cover, the operation lever pushing the bracket and engaging the upper housing with the bracket.

8 Claims, 4 Drawing Sheets

STEERING COLUMN OF VEHICLE

CROSS-REFERENCE TO RELATED APPLICATION

This application is a Continuation-in-Part of U.S. patent application Ser. No. 11/642,450 filed Dec. 20, 2006, entitled STEERING COLUMN OF VEHICLE, which claims priority to and the benefit of Korean Patent Application No. 10-2006-0115220 filed in the Korean Intellectual Property Office on Nov. 21, 2006, the entire contents of which applications are incorporated herein by reference.

BACKGROUND OF THE INVENTION

1. Field of the Invention

The present invention relates to a steering column of a vehicle. More particularly, the present invention relates to a steering column of a vehicle that can protect a driver's knee by disposing an operation lever inside a column cover in a locked state of the operation lever.

2. Description of Related Art

Generally, a steering system includes a steering wheel, a steering shaft connected to the steering wheel, and a steering column that includes a column tube wrapping the steering shaft, a main housing mounted at an exterior surface of the column tube, an upper housing rotatably connected to the column tube, and an operation lever for tilting and telescoping of the steering column.

A driver locks the operation lever and fixes the upper housing after controlling a position of the steering column by moving the upper housing in an unlocked state of the operation lever.

The steering column is installed in a protective column cover. One end of the operation lever protrudes outside of the column cover so the driver can control the operation lever easily. The operation lever is aesthetically unpleasing, and in the case of a collision, a knee of the driver may bump the operation lever and be injured.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a steering column of a vehicle that protects a driver's knee by disposing an operation lever inside a column cover when the operation lever is in a locked state.

In an aspect of the present invention, the steering column of a vehicle installed in a column cover, may include a main housing provided with a column tube therein, an upper housing rotatably connected to the column tube, including gear teeth at a lower portion of the upper housing, a bracket including a first end rotatably connected to the main housing, and a second end including gear teeth engaged with the gear teeth of the upper housing in a locked state, the bracket having a first protrusion at a lower surface of the second end, and an operation lever including a first end rotatably connected to the column cover, the operation lever having the second protrusion at an interior surface of the first end thereof such that the second protrusion pushes the first protrusion toward the upper housing in order to engage the gear teeth of the bracket with the gear teeth of the upper housing in the locked state.

A second end of the operation lever may be press fitted to the column cover in the locked state.

The second end of the operation lever may include a groove.

In another aspect of the present invention, the steering column may further include a shock-absorbing member for protecting a driver's knee, wherein the shock-absorbing member is attached to an interior surface of the operation lever.

In further another aspect of the present invention, the steering column may further include an elastic member interposed between the bracket and the main housing.

The elastic member may be attached to the bracket, wherein the elastic member may include a coil spring.

The first end of the bracket and the first end of the operation lever may be spaced with a predetermined distance.

A receiving groove formed in the upper housing may be connected to a hinge axis of the column tube, the diameter of the receiving groove being larger than the diameter of the hinge axis of the column tube.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
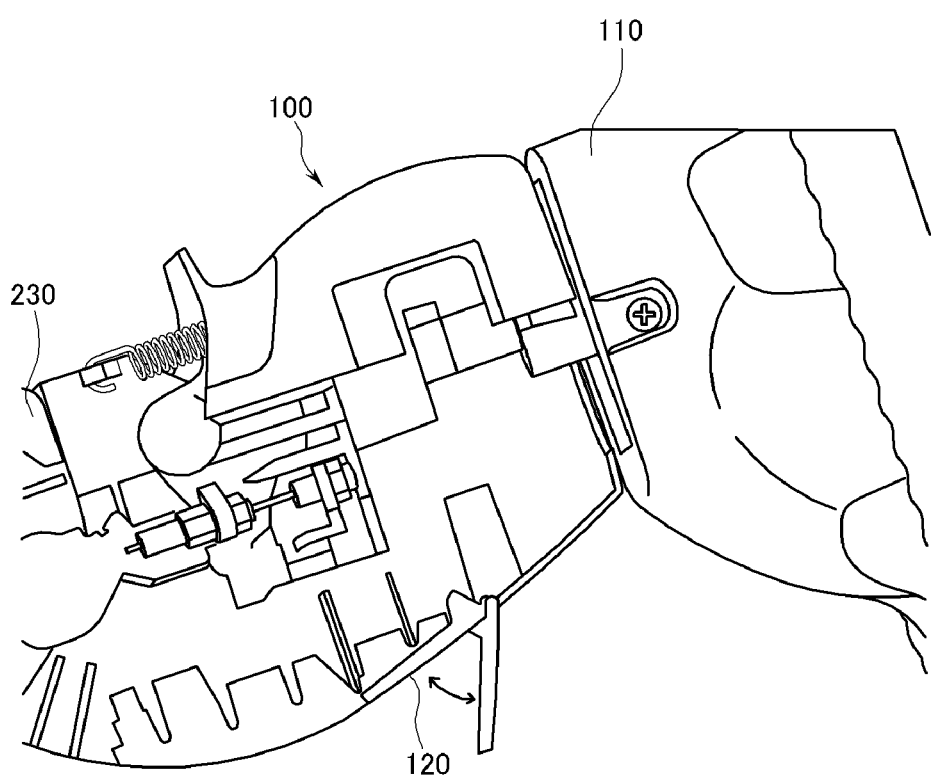
FIG. 1 is a side view of a steering column of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
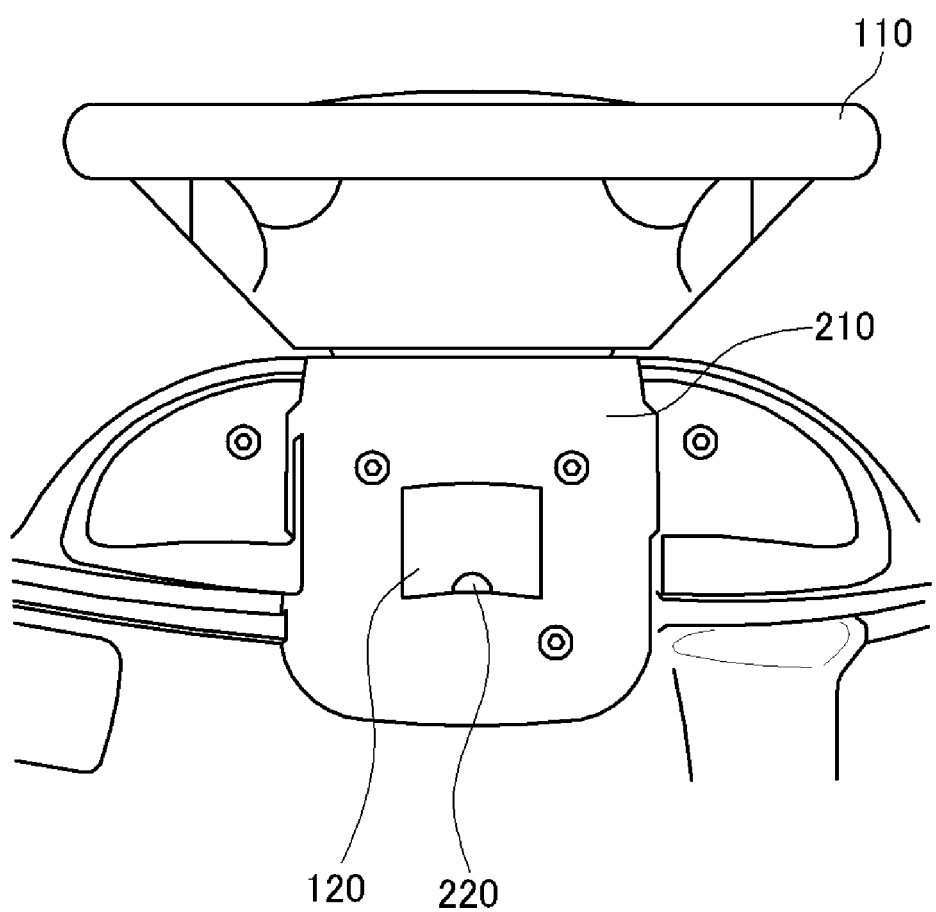
FIG. 2 is a rear view of a steering column of a vehicle according to an exemplary embodiment of the present invention.

As shown in FIG. 1 and FIG. 2, a steering column 100 of a vehicle according to an exemplary embodiment of the present invention is installed in a column cover 210. The column cover 210 may be made of plastic. A steering shaft is installed in the steering column 100, and the steering shaft is wrapped by a column tube 230. In addition, one end of the steering shaft is coupled with a steering wheel 110.

Figure 3:
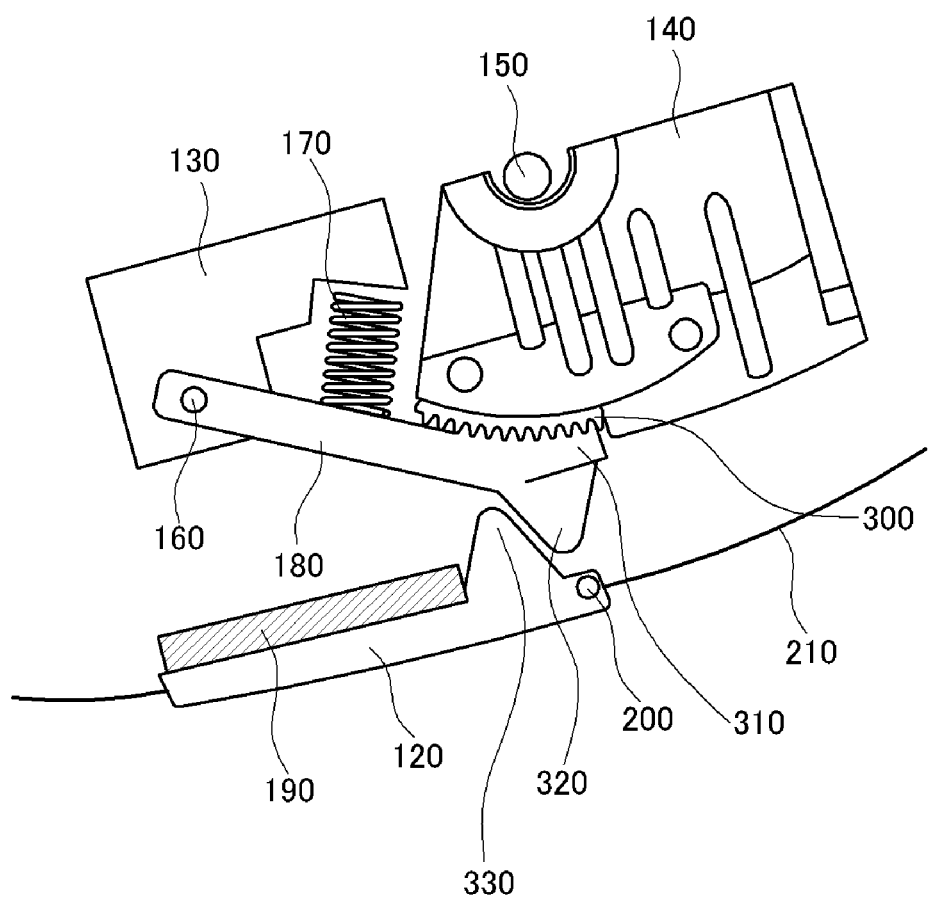
FIG. 3 shows a locked state of an operation lever according to an exemplary embodiment of the present invention.
Figure 4:
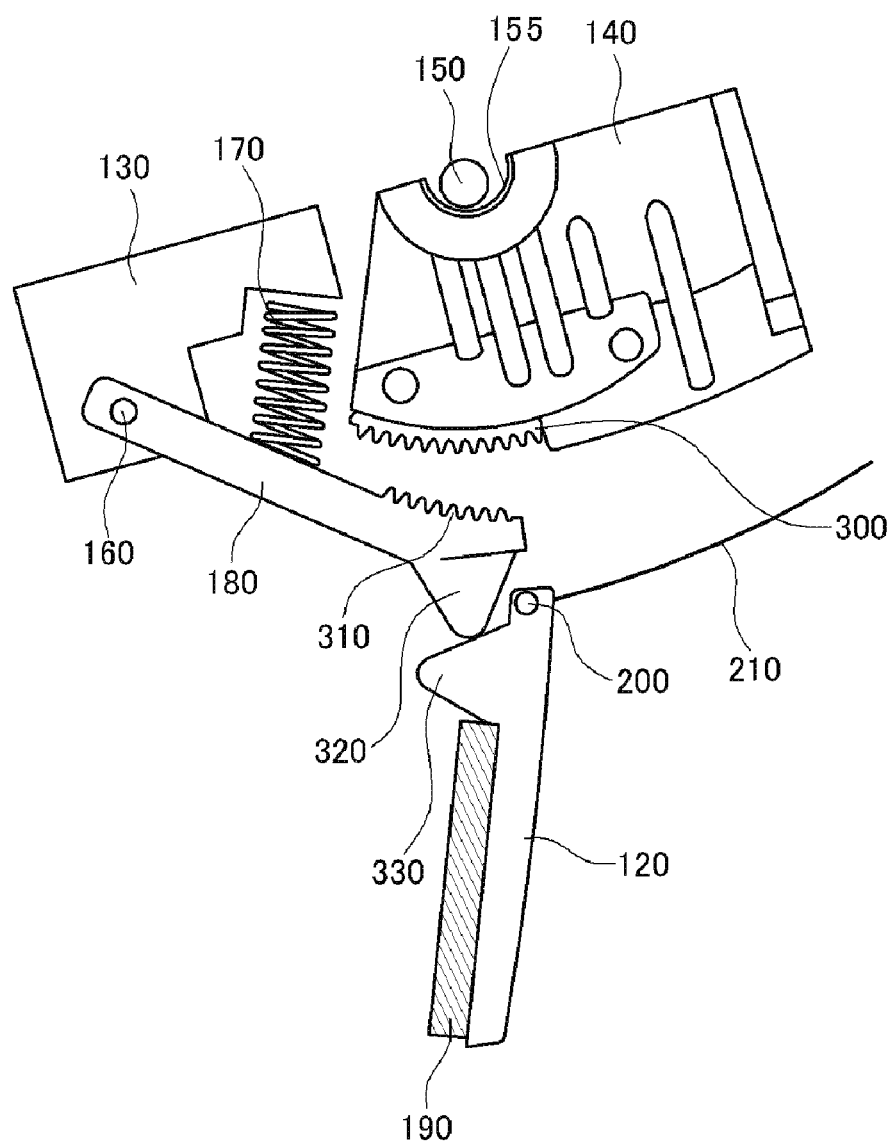
FIG. 4 shows an unlocked state of an operation lever according to an exemplary embodiment of the present invention.

As shown in FIG. 3 and FIG. 4, the steering column 100 may include a main housing 130 mounted at an exterior surface of the column tube 230 to protect the column tube 230. An upper housing 140 including a receiving groove 155 is connected to the column tube 230 and rotates around a first hinge axis 150 to adjust a position of the steering wheel 110. The diameter of the receiving groove 155 of the upper housing 140 may be larger than the first hinge axis 150 such that position of the steering wheel 110 can be adapted. Gear teeth 300 for fixing a position of the upper housing 140 are provided at a lower portion of the upper housing 140.

A bracket 180 has a first end connected to the main housing 130 that rotates around a second hinge axis 160, and gear teeth 310 engaged with the gear teeth 300 of the upper housing 140 are provided at an upper surface of a second end of the bracket 180. Therefore, the bracket 180 fixes the upper housing 140 at a specific position when the gear teeth 310 of the bracket 180 are engaged with the gear teeth 300 of the upper housing 140. In addition, the bracket 180 has a first protrusion 320 at a lower surface of the second end. The first protrusion 320 has a triangular shape.

In addition, an elastic member 170, such as a coil spring, is interposed between the main housing 130 and the bracket 180. When an operation lever 120 does not push the bracket 180, the elastic member 170 applies an elastic force to the bracket 180 and disengages the bracket 180 from the upper housing 140.

The operation lever 120 is positioned close to the bracket 180. One end of the operation lever 120 is connected to the column cover 210 and rotates around a third hinge axis 200. The other end of the operation lever 120 is press fitted to the column cover 210 in a locked state. In addition, as shown in FIG. 2, a groove 220 is provided at the other end of the operation lever 120. A driver inserts his finger in the groove 220 and rotates the operation lever 120 around the third hinge axis 200. The operation lever 120 has a second protrusion 330 at an interior surface of the other end. The second protrusion 320 has a triangular shape. The second protrusion 330 contacts with the first protrusion 320 of the bracket 180 and pushes the first protrusion 320 when the operation lever 120 rotates from an unlocked state to the locked state.

A shock-absorbing member 190 is attached to the interior surface of the operation lever 120. Generally, when the driver sits on a driver's seat, a driver's knee is positioned near the operation lever 120. If car accident occurs, the driver's knee may bump the operation lever 120. In this case, the shock-absorbing member 190 reduces impact applied from the bracket 180 to the driver's knee. The shock-absorbing member 190 may be foam plastic.

As shown in FIG. 3, in a locked state of the operation lever 120, the operation lever 120 pushes the bracket 180 and engages the bracket 180 with the upper housing 140. Thus, the upper housing 140 is fixed. In addition, the other end of the operation lever 120 is press fitted to the column cover 210. Therefore, the operation lever 120 does not protrude outside from the column cover 210.

As shown in FIGS. 2 and 4, when the driver inserts his finger in the groove 220 and rotates the operation lever 120 around the third hinge axis 200, the elastic member 170 applies the elastic force to the bracket 180 and disengages the bracket 180 from the upper housing 140. In this state, the driver rotates the upper housing 140 around the first hinge axis 150 and controls the position of the upper housing 140. After that, the driver pushes the operation lever 120 and engages the bracket 180 with the upper housing 140. Therefore, the upper housing 140 is fixed.

According to the present invention, when an operation lever is in a locked state, the operation lever may not protrude outside from a column cover and bump probability of a driver may be lowered. Therefore, a knee of the driver may be protected.

In addition, since a foam plastic is attached on the operation lever, impact may be reduced in the case that the knee of driver bumps the operation lever.

In addition, since a column cover is closed up by the operation lever, a steering column may be protected from dust.

Finally, engaging/disengaging operations of the operation lever may be facilitated.

For convenience in explanation and accurate definition in the appended claims, the terms "lower" and inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A steering column of a vehicle installed in a column cover, comprising:

a main housing provided with a column tube therein;

an upper housing rotatably connected to the column tube, comprising gear teeth at a lower portion of the upper housing;

a bracket comprising a first end rotatably connected to the main housing, and a second end comprising gear teeth engaged with the gear teeth of the upper housing in a locked state, the bracket having a first protrusion at a lower surface of the second end; and an operation lever comprising a first end rotatably connected to a column cover, the operation lever having a second protrusion at an interior surface of the first end thereof such that the second protrusion pushes the first protrusion toward the upper housing in order to engage the gear teeth of the bracket with the gear teeth of the upper housing in the locked state, a shock-absorbing member for protecting a driver's knee, wherein the shock-absorbing member is attached to an interior surface of the operation lever and is formed of a material different from the operation lever.

2. The steering column of claim 1, wherein a second end of the operation lever is press fitted to the column cover in the locked state.

3. The steering column of claim 2, wherein the second end of the operation lever comprises a groove.

4. The steering column of claim 1, further comprising an elastic member interposed between the bracket and the main housing.

5. The steering column of claim 4, wherein the elastic member is attached to the bracket.

6. The steering column of claim 4, wherein the elastic member comprises a coil spring.

7. The steering column of claim 1, wherein the first end of the bracket and the first end of the operation lever are spaced with a predetermined distance.

8. The steering column of claim 1, wherein a receiving groove formed in the upper housing is connected to a hinge of the column tube, the diameter of the receiving groove being larger than the diameter of the hinge of the column tube.

* * * * *